INVENTOR.
CARL F. BUHRER
BY
ATTORNEY.

United States Patent Office 3,369,122
Patented Feb. 13, 1968

3,369,122
ASYNCHRONOUS TRAVELING WAVE ELECTRO-OPTIC LIGHT MODULATOR
Carl F. Buhrer, Oyster Bay, N.Y., assignor to General Telephone and Electronics Laboratories, Inc., a corporation of Delaware
Filed Sept. 3, 1965, Ser. No. 484,912
14 Claims. (Cl. 250—199)

ABSTRACT OF THE DISCLOSURE

An asynchronous traveling wave light modulator is described wherein the phase velocity of a rotating modulating field differs from the light group velocity. The asynchronous condition is compensated for by utilizing a plurality of electro-optic crystals aligned to have a common 3-fold rotation axis. Each of the crystals is rotated about the common axis relative to adjacent crystals by an amount equal to one-third the rotation of the modulating field therein with respect to the rotation of the axis of polarization of the light beam.

---

This invention relates to electro-optic light modulators and in particular to a wideband traveling wave electro-optic light modulator.

Optical communications systems using coherent light sources display many advantages over conventional microwave channels. These optical systems exhibit great directivity and wide bandwidth and therefore a number of communications links, each transmitting a large number of messages, may operate within sight of each other at nearly the same optical wavelength without interference. Coherent light sources known as lasers have been developed, but the problems involved in transmitting information by means of a light beam remain significant.

For example, a light beam can be modulated at microwave frequencies by utilizing an electro-optic effect present in certain materials. An electric field varying at a particular frequency is used to vary the optical properties of a suitable medium, such as a crystal, at this same rate and thereby modulate a beam of light passing through the medium. For frequencies in the microwave region, the transit time of light through the medium may be a significant fraction of, or even several cycles of, the modulating frequency. Thus, during this transit time the microwave phase and therefore the phase of the time varying electro-optic effect will change. A cumulative modulating effect along the light path requires that any given photon or packet of light energy experience the same optical effects as it travels along its path through the modulator. For this reason, the amplitude or phase of the microwave field must be made to vary in a particular way along the light path or the modulation produced on the beam will not be cumulative over the region of interaction between the light and the microwave field.

Two general approaches to the problem of microwave light modulation are available. In the first, a short optical path in the modulating medium is used to keep the light transit time less than a half-cycle of the modulating frequency. However, the length of the optical path determines the amount of interaction between the modulating field and the light beam for a given power input. As a result, this approach has been found to require very high microwave fields in order to attain a practical index of modulation.

To provide these high microwave fields at reasonable microwave power input levels, it has been found necessary to locate the modulating medium inside a high-Q resonant cavity. However, as known in the art, such a cavity is effective only over a very narrow frequency region so that the modulator is generally incapable of wideband operation.

Alternatively, a traveling wave type light modulator may be employed wherein the optical transit time in the modulating medium is considerably greater than a half-cycle of the modulating frequency and the modulating field travels along the path with the light beam. At synchronism, when the microwave modulation on the light which travels at the light group velocity moves along with the microwave field at its phase velocity, each light photon experiences a constant microwave phase and if the electro-optic medium is uniform, a constant optical effect. The modulating effect is therefore cumulative, and relatively low amplitude fields can be used if the optical path length is made sufficiently long. For operation at a single microwave frequency, this synchronism condition need only be satisfied at that one frequency and the input power requirement can be reduced further by constructing the modulator in the form of a microwave resonant cavity.

A traveling wave type modulator can be operated over a wide bandwidth if the traveling microwave energy is absorbed at the output of the modulator to avoid resonance effects and if the microwave phase velocity is independent of frequency over the region of interest to maintain synchronism. Such a non-dispersive microwave propagating structure may be obtained by using transverse electromagnetic or TEM waves. However, non-dispersive TEM waves exist only on coaxial or parallel line type structures with cross sectional dimensions small compared to a microwave wavelength. Thus, practical size structures are limited in frequency to about 2000 megacycles.

A wideband synchronous traveling wave modulator requires a microwave propagating structure in which two conditions of synchronism are satisfied. The conditions are that both the microwave phase and group velocities must equal the light group velocity since these microwave velocities are equal to each other when there is no microwave dispersion. However, the most practical microwave propagating structures for traveling wave modulators are waveguides which are dispersive. Thus, a need arises for a traveling wave electro-optic modulator which provides cumulative modulation over a wide bandwidth without the requirement that both of the above synchronism conditions be satisfied.

Accordingly, an object of the present invention is the provision of a wideband traveling wave type light modulator wherein the modulation is cumulative.

Another object is the provision of a cumulative modulator employing a dispersive microwave propagating structure in which the light group velocity and microwave phase velocity are asynchronous.

A further object is to provide a wideband modulator capable of producing cumulative modulation of light at high microwave frequencies.

Still another object is the provision of a wideband light modulator capable of producing single sideband type modulation.

In accordance with the present invention, an asynchronous wideband electro-optic modulator is provided in which the phase velocity of the microwave modulating signal is made to differ from the light group velocity in a predetermined manner. The construction of the modulator is such as to compensate for this asynchronism over a wide band of modulating frequencies and provide cumulative modulation of the light beam along its optical path in the electro-optic medium.

These conditions are obtained in the present modulator by employing a multicrystal electro-optic medium positioned in a waveguide structure and comprising a plurality of crystals exhibiting a transverse electro-optic effect and having a 3-fold rotation axis in its point group. As known in the art, an electro-optic crystal when exposed to an electric field becomes anisotropic such that beams of electromagnetic energy, such as light, with the same direction of propagation but different directions of polarization travel through the crystal with different velocities. In particular, there will be two principal directions of polarization perpendicular to each other corresponding to the crystal axes of induced birefringence. If a beam having these two different polarization components starts moving through the crystal, the one with the slower velocity will be shifted in time phase or retarded with respect to the other. The amount of the retardation due to the induced birefringence in the crystal is proportional to the field strength and the optical path length of the crystal. In a crystal exhibiting a transverse electro-optic effect, an electric field perpendicular to the direction of light propagation induces the retardation.

In addition, each electro-optic crystal is selected to have at least one 3-fold rotation axis in its symmetry point group. In some crystals of this type, a 3-fold rotation axis of the point group corresponds to a 3-fold rotation axis in the crystal; in others it corresponds to a 3-fold screw axis in the crystals. In both cases, a 3-fold rotation axis in its point group defines an axis of symmetry existing in the crystal such that after a 120° rotation about the axis the crystal assumes a congruent position. Further information on the geometrical features of crystals and the notation used to describe their symmetries may be obtained by reference to the textbook "Elementary Crystallography" by M. J. Bauerger, published by John Wiley & Sons, Inc., New York, 1956.

The electro-optic crystals in the present invention are each aligned to form a multicrystal structure in which a 3-fold axis of rotation of each crystal is substantially collinear with those of the other crystals to form a common 3-fold axis of rotation. The multicrystal structure is then positioned in a waveguide so that the common axis is aligned with the waveguide axis. A polarized light beam is transmitted through the multi-crystal structure parallel to the collinear axes of rotation. This light beam is the optical carrier and can be modulated by the application of an electric field transverse to the multi-crystal structure.

The modulating signal applied to the multicrystal structure within the waveguide is an electric field which rotates about the collinear axis of rotation in a plane normal thereto at an angular frequency $\omega_m$ corresponding to the modulation frequency $f_m$. The rotating or circularly polarized electric field may be considered as comprising two orthogonal components having a 90° relative phase angle in a plane transverse to the common axis. The angle between the resultant rotating electric field and a stationary reference axis lying in a plane perpendicular to the common axes of the multicrystal structure varies with time $t$ and the distance $z$ traveled along the optical path. This angle may be expressed as $(\omega_m t - \beta z)$ wherein $\beta$ is the phase constant of the waveguide.

In a synchronous traveling wave light modulator the microwave phase velocity $\omega_m/\beta$ is made equal to the light group velocity so that each photon of light sees in effect a constant phase microwave field. However for wide bandwidth operation of this type, $\omega_m/\beta$ must be constant and as previously pointed out this requirement implies that the microwave group velocity $d\omega_m/d\beta$ equal the phase velocity. This condition has heretofore prevented the construction of wideband high frequency modulators.

In the present modulator, a condition of asynchronism between the microwave phase velocity $\omega_m/\beta$ and the light group velocity $V_1$ is deliberately introduced to provide an extra degree of freedom of design. The amount of asynchronism $\psi$ is expressed by $$\psi = (\omega_m/V_1 - \beta)$$

Unlike the condition of synchronism, here the quantity $\psi$ is a non-zero constant which may be chosen to permit cumulative modulation over a wide band of frequencies. When the above equation is restated to define a dispersion relation, it appears as $$\omega_m = V_1(\beta + \psi)$$

It will be noted from the equation that the microwave group velocity $d\omega_m/d\beta$ still must equal the light velocity while the microwave phase velocity $\omega_m/\beta$ is dependent upon the angular velocity of the modulating field $\omega_m$. The net result is that one of the velocity matching requirements of synchronism has been removed by permitting $\psi$ to have values other than zero.

The ideal microwave dispersion curve required for wideband synchronous operation showing the relation of $\omega_m$ to $\beta$ is a straight line having a zero-intercept, i.e. $\psi = 0$, and slope of $d\omega/d\beta$ equal to the velocity of light in the electro-optic medium. The microwave dispersion curve for a typical hollow waveguide is a nonlinear curve having an $\omega$-axis intercept determined by the cut-off frequency of the waveguide. By displacing the intercept of the ideal dispersion curve by an amount equal to $-\psi$, this dispersion curve can be made to substantially coincide with the dispersion curve of the waveguide over a range of frequencies. In this frequency region, a waveguide type structure can be employed to provide the desired cumulative asynchronous traveling wave operation of an electro-optic modulator.

The slope of the dispersion curve which determines the light velocity is an inverse function of the index of refraction of the medium through which the light travels. Also, the shape of the dispersion curve of the waveguide can be altered by varying the effective dielectric constant of the waveguide medium. By proper selection of the value of $\psi$ and the effective dielectric constant of the waveguide, the dispersion curve of the waveguide can be made to substantially coincide with the ideal dispersion curve over a wide band of frequencies. This enables the microwave group velocity to be essentially equal to the light velocity and satisfies the one remaining requirement for wide band operation.

Once the desired condition of asynchronism and the slope of the dispersion curves have been selected, the electro-optic crystals within the waveguide are oriented so as to provide cumulative modulation along the entire optical path length of the multi-crystal structure. This orientation of the individual crystals is necessary to compensate for the fact that the rotating microwave field travels along the optical path with its phase velocity unequal to the light velocity. Without this compensation, each photon of light would experience a different optical effect in each crystal. Due to the differences in velocity, the modulation field is found to have a phase factor $\psi z$ relative to the moving light. Since the microwave field is circularly polarized, the phase factor amounts to a twist in the rotational orientation of the transverse modulating field along the light path. In order to provide cumulative modulation, the birefringence induced by this field must have principal axes, which are fixed relative to the moving light.

The direction of the axes of induced birefringence in each segment of electro-optic crystal depends both on the orientation of the transverse modulating field and on the rotational orientation of the crystal segment about its 3-fold symmetry axis collinear with the light beam direction. Therefore, by suitably orienting each crystal segment comprising the electro-optic medium it is possible to compensate for this phase factor $\psi z$ and provide for cumulative modulation.

In addition, certain electro-optic crystals, such as those of classes 23 and 32, are optically active, i.e. they rotate the axes of the polarization of the light beam passing through them. This effect, if present in the crystals selected for the multicrystal structure, must also be considered in determining the crystal orientations for compensation of the asynchronism. And for cumulative modulation in the presence of optical activity, it is required that each photon experience a birefringent effect with the principal axes of induced birefringence having a rotational orientation about the beam that varies linearly along the light path at the same rate at which the optical activity rotates the light polarization state.

Thus, the required twist in the rotational orientation of each crystal segment with respect to the preceding one depends on both the quantity $\psi$ resulting from the asynchronism introduced to permit wideband operation and on the quantity $\rho$, the optical rotation per unit length present if the crystals are also optically active.

Further features and advantages of the invention will become more readily apparent from the following detailed description when taken in conjunction with the accompanying drawings in which.

Figure 1:
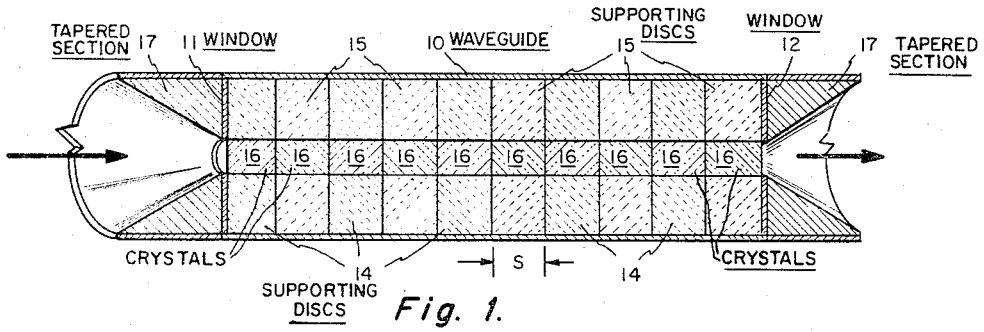
FIG. 1 is a side view in section of one embodiment of the present invention.

Referring now to FIG. 1, an electro-optic modulator is shown comprising a section of hollow circular waveguide 10 having a quartz window 11, 12 at each end. Within the waveguide, a series of supporting discs 14 and 15 are alternately positioned along the waveguide axis. Each of these discs is provided with a central opening for supporting an electro-optic crystal 16 therein. The central openings of the discs are aligned so that the electro-optic crystals so supported are positioned along the axis of the waveguide.

The supporting discs 14 are preferably chosen to have a dielectric constant different from that of discs 15. The alternate placement of these discs results in a periodic microwave structure having a dispersion curve well suited for use in the present invention. The importance of the shape of the waveguide dispersion curve will later be explained.

An electro-optic crystal 16 is mounted in each of discs 14, 15. Each crystal exhibits a transverse electro-optic or Pockels effect and has a 3-fold rotation axis in its symmetry point group. The 3-fold rotation axis defines an axis of symmetry in the crystal and each crystal is positioned so that a 3-fold axis of rotation of each crystal is substantially collinear with an axis of the other crystals to form a common rotation axis. In addition, this common axis is aligned with the axis of the waveguide. To reduce any reflections, spaces between adjacent crystals may be filled with a conventional silicone fluid or the like having a closely matching refractive index.

A circularly polarized transverse electric field, for example the $TE_{11}$ modes, is supplied to and travels within the waveguide. Both ends of the waveguide 10 may be provided with matching tapered sections 17 to facilitate connection to additional microwave components. However, any connecting components employed should provide for the passage of the light beam to be modulated. This can be readily provided in the external input circuit by the use of a 90° bend having a light beam entrance port and in the external output circuit by using a power termination having a light exit port on its axis.

Since the electro-optic crystals 16 exhibit the transverse Pockels effect and are oriented so that a 3-fold symmetry axis is aligned with the waveguide axis, the orientation of the transverse electric field in the waveguide relative to the fixed crystallographic axes of the crystal determines the orientation of the axes of induced birefringence for a light beam traveling along the waveguide axis. And, the use of a $TE_{11}$ mode waveguide or the like which supports a rotating electric field results in the rotation of the axes of induced birefringence. The induced axes are rotated by the field as it travels along the waveguide with the rotation being a function of the angular velocity $\omega_m$ of the field and the distance $z$ traveled along the waveguide axis.

In addition, the light beam to be modulated is applied to and travels along the waveguide axis as shown by the arrows of FIG. 1. This light beam may be provided by an optical maser or other source of collimated, essentially monochromatic light. When traveling through the multicrystal structure, the light beam may be considered as having two orthogonal plane polarized components. The electro-optic effect resulting from the birefringence induced by the microwave electric field modulates the beam of light by the relative retardation of one of the orthogonal components. In practice, the principal axes are referred to as the "slow" and "fast" axes. The amount of relative phase retardation is determined by the strength of the modulating field, i.e. the input power, and by the optical path length of the multicrystal structure.

Figure 2:
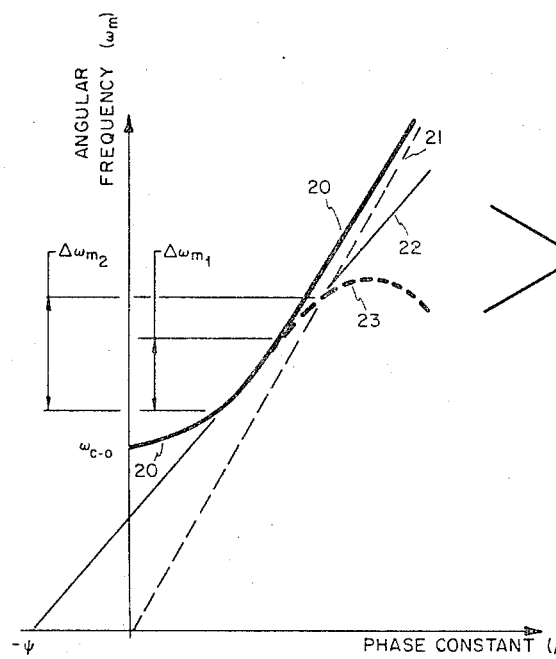
FIG. 2 is a dispersion diagram of the embodiment of FIG. 1.

Referring now to FIG. 2, the dispersion curve for the fundamental mode of a typical waveguide is shown by curve 20. It is seen that the microwave group velocity $d\omega_m/d\beta$ (which is the slope of the curve) varies significantly with the angular frequency of the microwave field at frequencies near cut-off. The group velocity of the waveguide is zero at cut-off $\omega_{c-0}$ and increases with increasing frequency. The curve 20 asymptotically approaches dashed line 21 at frequencies well above cut-off so that its slope is substantially equal to the slope of curve 21.

The slope of a symptote 21 is an inverse function of the effective dielectric constant of the the medium in which the electric field is traveling and may be varied accordingly. If this asymptote is selected such that its slope corresponds to the velocity of the light beam traveling through the modulator, it will be noted that it passes through the origin and represents the condition wherein $$\omega_m = V_1\beta \text{ or } V_1 = \omega_m/\beta$$

Thus, the microwave phase velocity $\omega_m/\beta$ and the microwave group velocity $d\omega_m/d\beta$ of the modulating field both equal the light velocity at light frequencies. This is the condition for synchronism at which each photon of the light beam sees a constant phase microwave field and therefore a constant birefringent effect as it travels through a homogeneous electro-optic medium. It will be noted from FIG. 2 that actual dispersion curve 20 approaches line 21 only at frequencies well above cut-off where a number of different modes may exist. Thus, a different condition is required to provide wideband modulation at lower frequencies nearer to cut-off wherein the higher-order modes are suppressed.

To this end, an ideal dispersion characteristic 22 offset from the origin is shown in FIG. 2. This curve describes a condition of asynchronism wherein $$\omega_m = V_1(\beta + \psi)$$

with $-\psi$ being the offset or amount of asynchronism introduced. The slope of characteristic 22 is the light group velocity $V_1$ and is determined by the indices of refraction for the particular electro-optic crystals employed. By selecting the value of $\psi$ such that curve 22 substantially coincides with curve 20 over a wide band of frequencies relatively near the cut-off frequency of the waveguide, cumulative modulation can be attained without the existance of higher order modes.

Although the asynchronous condition set forth above permits the microwave group velocity to equal the light group velocity over a wide band, the difference between the light group velocity and the microwave phase velocity must be compensated for in order to attain cumulative modulation. This compensation is necessary since each light photon does not experience a constant microwave phase. As a result, each electro-optic crystal segment must be oriented such that the axes of the induced birefringence due to the electric field appear with fixed orientation to each photon of light traveling through the multicrystal structure. In addition, if the electro-optic medium is optically active the axis of induced birefringence must be made to twist along the modulator at a rate determined by the optical rotation present.

As mentioned previously, the rotating electric field becomes out of phase with the traveling light beam upon passing through multicrystal structure. The relative phase difference per crystal is equal to $\psi s$ where $s$ is the distance between the entering face of one crystal and the entering face of the next succeeding crystal. It has been found that the effect of this phase difference upon the orientation of the axes of the induced birefringence can be essentially eliminated by the relative rotation of the axes of each crystal by $\frac{1}{3} \psi s$ more than that of the preceding crystal, the rotation being about the collinear axes of symmetry.

Figure 3:
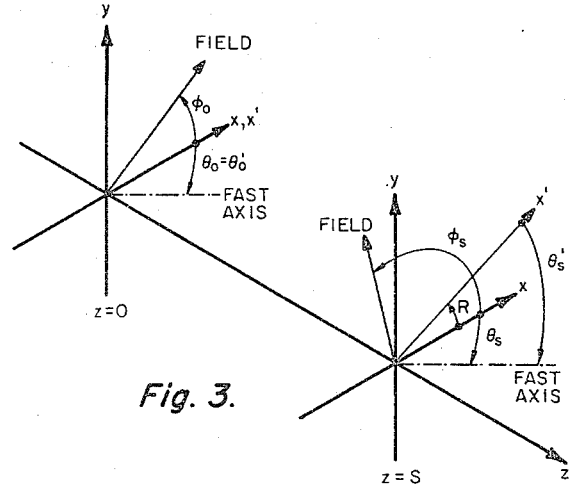
FIG. 3 shows the orientation of two adjacent crystal segments in the embodiment of FIG. 1.

By so rotating each crystal, the angle between the "fast" axis of the induced birefringence and a stationary axis is found to be independent of the distance $z$ traveled through the multicrystal structure. This is shown in FIG. 3 wherein the orientations of the axes of two representative crystals of the multicrystal structure of FIG. 1 are shown. The two crystals are located on the fixed $x$, $y$, $z$ coordinate system with the succeeding crystal being displaced along the $z$ axis by a distance $s$. The crystals are positioned to have a 3-fold symmetry axis along the $z$ axis or light direction.

The $x'$ axis, shown initially as coinciding with the fixed $x$ axis, represents for each crystal the direction corresponding to the fast axis produced by an electric field in the same direction. This $x'$ axis is a fixed property of each crystal and may be rotated with respect to the fixed $x-y$ axes by the rotation of the crystal about a 3-fold symmetry axis. In operation, location of the fast axis in a crystal is determined primarily by the direction of the electric field. In FIG. 3, the fast axis is labeled as such with the angle between the fast axis and the $x$ coordinate referred to as $\theta$ and the angle between the fast axis and the $x'$ direction being termed $\theta'$. The $x$ and $x'$ directions coincide in the first crystal at $z=0$ so that $\theta_0 = \theta_0'$. In addition, the angle between the transverse electric field and the $x$ coordinate is termed $\phi$ and is the angle $(\omega_m t - \theta z)$ or $\omega_m t'$ with the time $t'$ being a dependent time scale relative to the light beam of $(t-z/V_1)$.

The angle $\theta'$ between the induced fast axis and the $x'$ axis is found to be minus one half the angle between the field direction and $x'$. This rotation is due to the fact that the optical properties of the crystal depend not only on the magnitude of the electric field but also on the direction. The derivation and additional information concerning the angle $\theta'$ between the induced fast axis and $x'$ may be found in an article by Buhrer, Bloom and Baird in Applied Optics, vol. 2, p. 839.

At $z=0$, the first crystal is oriented such that $x'$ and $x$ coincide and $\theta_0 = \theta_0'$ and the angle between the electric field and the $x$ coordinate is $\phi_0$ which is a time varying angle equal to $\omega_m t'$. Therefore, $\theta_0 = \theta_0' = -\frac{1}{2}\phi_0 = -\frac{1}{2}\omega_m t'$ at $z=0$.

However at $z=s$, the crystal is rotated about the 3-fold symmetry axis or $z$ axis by an angle R so that $x'$ and $x$ no longer coincide. In addition, the applied field has rotated so that it makes an angle $\phi_s = \omega_m t' + \psi s$ with the $x$ coordinate. The angle between the induced fast axis and the $x'$ axis, $\theta_s'$, is equal to minus one half the angle between field direction and $x'$, $(\phi_s - R)$. Therefore, at $z=s$, $$\theta_s' = -\frac{1}{2}(\phi_s - R)$$

and $$\theta_s = R + \theta_s'$$

Since the rotation of the electric field has an additional phase factor of $\psi s$ due to the asynchronism $$\theta_s' = -\frac{1}{2}(\omega_m t' + \psi s - R)$$

and by substitution $$\theta_s = \frac{1}{2}R - \frac{1}{2}\omega_m t' - \frac{1}{2}\psi s$$

Therefore, in order that $$\theta_s = \theta_0 = -\frac{1}{2}\omega_m t'$$

$$R = (\frac{1}{3})\psi s$$

thereby insuring that the orientation of the fast axes in the selected crystal segments are equal for any given value of $t'$. Thus the modulating effect on the beam will be cumulative.

In practice, the actual dispersion may be permitted to deviate somewhat from the value of $\psi$ determined by $$\psi = (\omega_m/V_1 - \beta)$$

The deviation would appear in the diagram of FIG. 2 as a shift in the $\beta$-axis intercept of curve 22. However, it will be noted that the product of the deviation and the interaction length in the modulator represent a net uncompensated twist in the electric field along the modulator which degrades the modulator performance and reduces the index of modulation attainable. Thus, the permissible deviation depends upon the total interaction length of the particular modulator.

In addition, if the electro-optic crystals are optically active, for example cubic crystals of class 23, the axes of the light polarization are rotated as the light travels through the multicrystal structure. This additional rotation must be compensated for in the relative rotation of each crystal about the collinear axis of symmetry in order to provide cumulative modulation. The axes of the light polarization are rotated through an angle of $-\rho s$ in traveling from $z=0$ to $z=s$ in FIG. 3, where $\rho$ is the clockwise rotation (negative direction) per unit length of crystal. Compensation of this rotation requires that $$\theta_s - \theta_0 = -\rho s$$

such that the angle $\theta$ would follow this rotation. This is provided by increasing the angle R between the $x'$ and $x$ axes at FIG. 3 to $$R = (s/3)(\psi - 2\rho)$$

wherein the factor of 2 is provided to compensate for the angle between the induced fast axis and the $x'$ axis being minus one-half the angle between the field direction and $x'$. It will be noted that in the special case wherein twice the optical activity per unit length is equal to the amount of asynchronism $\psi$ introduced, the required relative rotation of each crystal about the collinear axis of symmetry is zero. Also, the above equation for R becomes $\psi s/3$ for crystals not exhibiting optical activity, i.e. $\rho = 0$.

The above discussion has shown that the present invention provides cumulative modulation while removing the condition on the modulating field phase velocity by introducing a periodic variation in the orientation of the crystal segments comprising the electro-optic medium. However, in order to attain the cumulative effect over a wide band of frequencies, it is necessary to insure that the light and modulating field group velocities are equal over this band.

The required equality for a modulator wherein dielectric supporting discs 14 and 15 have equal dielectric constants is shown in FIG. 2 as existing over a range of angular velocities $\Delta\omega_{m1}$. The width of this range corresponds to the frequency band within which cumulative modulation occurs and is determined by the length of microwave dispersion curve 20 substantially coinciding with the required dispersion line 22.

By selecting dielectric discs 14 and 15 to have different dielectric constants, the waveguide becomes a periodic structure with a period equal to $2s$ or twice the length of the crystal segments 16. And as the frequency of the modulating field increases, the microwave dispersion curve becomes periodic as shown by dashed curve 23. This structure results in an increase in the linearity of the microwave dispersion curve and provides an increased range of angular velocities $\Delta\omega_{m2}$ within which cumulative modulation can take place. Thus, the periodic structure results in a wider modulating frequency bandwidth.

In one embodiment constructed as shown in FIG. 1 with a 10-cm. section of waveguide 10 having a 2.5 cm. diameter, twenty electro-optic crystals 16 belonging to crystal class 23 were employed. Dielectric discs 14 were filled plastic having a dielectric constant of 1.8 and discs 15 were foam plastic having a dielectric constant of 1.12. The waveguide dispersion curve 23 of FIG. 2 was tangent to the straight line having a reciprocal slope $c/V_1$ of 1.6 and a value for $\psi$ of 1.24 over the frequency band of 7.5 to 12 gc./sec.

Figure 4:
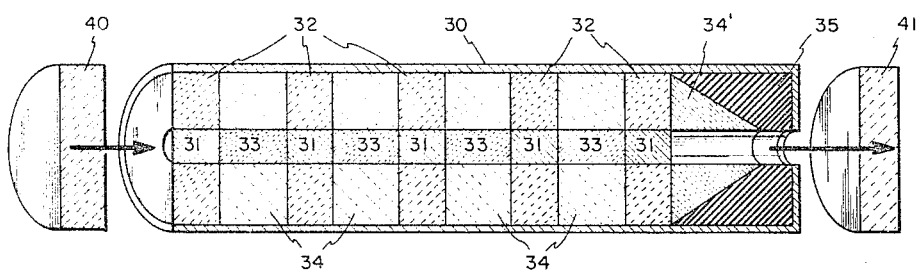
FIG. 4 is a side view in section of a second embodiment.

The embodiment of FIG. 4 is also a periodic structure comprising circular waveguide 30 containing dielectric discs 32 and 34 having different dielectric constants, cylindrical electro-optic crystals 31 supported in discs 32, and a cylindrical transparent dielectric medium 33 supported in discs 34. The light beam propagates along the axis of the structure in the direction of the arrows through crystals 31 and medium 33. As shown, the last disc 34' is tapered with a mating disc 35 of microwave power absorbing material provided adjacent thereto to prevent the reflection of the modulating field at the output end of the structure.

The period of this embodiment includes the crystal length $a$ and the length $b$ of transparent medium 33. It will be noted that the light velocity in the modulator is not determined solely by the crystal index of refraction as with the embodiment of FIG. 1, but also by the index of the cylindrical medium 33. By employing a material, such as optical glass, having a refractive index greater than that of the crystals as the medium 33, the average light velocity can be lowered and the equality between the light and modulating field group velocity may be more readily attained.

The present traveling wave modulator can be used to produce single-side band light modulation by the use of polarizer 40 and analyzer 41. For example if the input light beam is left circularly polarized by polarizer 40, the use of a right circular polarization analyzer 41 at the output will provide single-sideband suppressed-carrier modulation. However if a plane polarization analyzer is employed at the output, the modulator produces single-sideband with carrier. And without an analyzer, the output of the modulator is single-sideband polarization modulated light.

While the above description has referred to specific embodiments, it is apparent that many variations and modifications may be made therein without departing from the spirit and scope of the invention.

What is claimed is:

1. Apparatus for modulating an incident polarized beam of electromagnetic radiation which comprises
   (a) a plurality of field responsive crystals having principal axes of birefringence therein, each of said crystals having a 3-fold rotation axis in its symmetry point group with said crystals being aligned to form a common 3-fold rotation axis, and
   (b) means for applying a rotating modulating field within said plurality of crystals thereby providing rotation of the principal axes of birefringence of said crystals, each of said plurality of crystals being rotated about said common 3-fold axis by an amount equal to one-third the rotation of the field therein with respect to the axes of polarization of said beam whereby the beam emerging from said crystals is cumulatively modulated.

2. Apparatus for modulating an incident polarized beam of electromagnetic radiation which comprises
   (a) a plurality of crystals exhibiting an electro-optic effect and having principal axes of birefringence therein, each of said crystals having a 3-fold rotation axis in its symmetry point group with said crystals being aligned to form a multicrystal structure having a common 3-fold rotation axis, and
   (b) means for applying a rotating modulating electric field within said plurality of crystals thereby producing rotation of the principal axes of birefringence of said crystals, each of said plurality of crystals being rotated about said common 3-fold axis by an amount equal to one-third the rotation of the electric field therein with respect to the axes of polarization of said beam whereby the beam emerging from said crystals is cumulatively modulated.

3. Apparatus for modulating an incident polarized beam of electromagnetic radiation which comprises
   (a) a waveguide;
   (b) a multicrystal structure positioned within said waveguide, said structure comprising a plurality of crystals exhibiting an electro-optic effect and having principal axes of birefringence therein, each of said crystals having a 3-fold rotation axis in its symmetry point group with said crystals being aligned to form a common 3-fold rotation axis;
   (c) means for supporting said multicrystal structure in axial alignment within said waveguide, and
   (d) means for applying a rotating modulating electric field within said multicrystal structure, said field rotating about said common axis to provide rotation of the principal axes of birefringence of said crystals, each individual crystal in said multicrystal structure being oriented about said common axis such that the principal axes are substantially fixed with respect to the beam traveling therethrough, the beam emerging from the multicrystal structure being cumulatively modulated by said plurality of electro-optic crystals.

4. Apparatus for modulating an incident polarized beam of electromagnetic radiation which comprises
   (a) a waveguide;
   (b) a multicrystal structure positioned within said waveguide, said structure comprising a plurality of crystals exhibiting an electro-optic effect and having principal axes of birefringence therein, each of said crystals having a 3-fold rotation axis in its symmetry point group with said crystals being aligned to form a common 3-fold rotation axis;
   (c) means for supporting said multicrystal structure in axial alignment within said waveguide; and
   (d) means for coupling said modulating signal to said waveguide to provide a rotating electric field therein, said field rotating about the common axis in a plane perpendicular thereto to provide rotation of the principal axes of birefringence of said crystals, each individual crystal in said multicrystal structure being rotated about said common axis by an amount equal to one-third the rotation of the electric field therein with respect to the axes of polarization of said beam, whereby the beam emerging from the multicrystal structure is cumulatively modulated.

5. Apparatus for modulating an incident polarized beam of light in accordance with an asynchronous traveling-wave modulating signal which comprises
   (a) a waveguide for supporting a transverse rotating electric field therein;
   (b) a multicrystal structure positioned within said waveguide, said structure comprising a plurality of crystals exhibiting a transverse electro-optic effect and having principal axes of birefringence therein, each of said crystals having a 3-fold rotation axis in its symmetry point group with said crystals being aligned to form a common 3-fold rotation axis;
   (c) dielectric means surrounding said multicrystal structure within said waveguide, said dielectric means having a dielectric constant such that the group velocity of the modulating signal is substantially equal to the velocity of said incident light over a wide band of frequencies; and
   (d) means for coupling said modulating signal to said waveguide to provide a rotating electric field therein, said field providing rotation of the principal axes of birefringence of said crystals, each individual crystal in said multicrystal structure being rotated about said common axis with respect to the preceding crystal by an amount equal to one-third the rotation of said electric field therein with respect to the axes of polarization of said beam whereby the light beam emerging from the multicrystal structure is cumulatively modulated.

6. Apparatus for modulating an incident polarized beam of light in accordance with an asynchronous traveling-wave modulating signal which comprises
(a) a waveguide for supporting a transverse rotating electric field therein;
(b) a multicrystal structure positioned within said waveguide, said structure comprising a plurality of crystals exhibiting a transverse electro-optic effect and having principal axes of birefringence therein, each of said crystals having a 3-fold rotation axis in its symmetry point group with said crystals being aligned to form a common 3-fold rotation axis;
(c) dielectric means for supporting said multicrystal structure in axial alignment within said waveguide, said means having a periodic dielectric constant such that the dispersion curve of said waveguide is periodic, the effective dielectric constant of said multicrystal structure and said dielectric means being selected such that the group velocity of the modulating signal is substantially equal to the velocity of said incident light over a wide band of frequencies; and
(d) means for coupling said modulating signal to said waveguide to provide a rotating electric field therein, said field providing rotation of the principal axes of birefringence of said crystals, each individual crystal in said multicrystal structure being rotated about said common axis with respect to the preceding crystal by an amount equal to one-third the rotation of said electric field therein with respect to the axes of polarization of said beam whereby the light beam emerging from the multicrystal structure is cumulatively modulated.

7. Apparatus for modulating an incident polarized beam of light in accordance with an asynchronous traveling-wave modulating signal which comprises
(a) a waveguide for supporting a transverse rotating electric field therein;
(b) a periodic multicrystal structure positioned within said waveguide, said structure comprising
(1) a plurality of crystals exhibiting a transverse electro-optic effect and having principal axes of birefringence therein, each of said crystals having a 3-fold rotation axis in its symmetry point group with said crystals being aligned so that a rotation axis of each is collinear with a rotation axis of the other crystals, and
(2) first dielectric means positioned between adjacent crystals, the velocity of light through the multicrystal structure being determined by the indices of refraction of said crystals and said first dielectric means;
(c) second dielectric means for supporting said multicrystal structure in axial alignment within said waveguide, said second means having a periodic dielectric constant such that the dispersion curve of said waveguide is periodic, the effective dielectric constant of said multicrystal structure and said second dielectric means being selected such that the group velocity of the modulating signal is substantially equal to the velocity of said incident light over a wide band of frequencies; and
(d) means for coupling said modulating signal to said waveguide to provide a rotating electric field therein, said field providing rotation of the principal axes of birefringence of said crystals, each individual crystal in said multicrystal structure being rotated about said common axis with respect to the preceding crystal by an amount equal to one-third the rotation of said electric field therein with respect to the axes of polarization of said beam whereby the light beam emerging from the multicrystal structure is cumulatively modulated.

8. Apparatus in accordance with claim 7 in which said first dielectric means has an index of refraction at least equal to that of said electro-optic crystals.

9. Apparatus for modulating an incident polarized beam of light in accordance with an asynchronous traveling-wave modulating signal which comprises:
(a) a waveguide for supporting a transverse rotating electric field therein;
(b) a multicrystal structure positioned within said waveguide, said structure comprising a plurality of crystals exhibiting a transverse electro-optic effect and having principal axes of birefringence therein, each of said crystals having a 3-fold rotation axis in its symmetry point group with said crystals being aligned to form a common 3-fold rotation axis;
(c) dielectric means surrounding said multicrystal structure within said waveguide, said dielectric means having a dielectric constant such that the group velocity of the modulating signal is substantially equal to the velocity of said incident light over a wide band of frequencies; and
(d) means for coupling said modulating signal to said waveguide to provide a rotating electric field therein having a phase velocity differing from the velocity of said incident light to produce rotation of said principal axes of birefringence with respect to the axes of polarization of said beam, each crystal in said multicrystal structure being rotated about said common axis with respect to the preceding crystal by an amount equal to one-third the rotation of the electric field therein with respect to the axes of polarization of said beam, the light beam emerging from the multicrystal structure being cumulatively modulated by said plurality of electro-optic crystals.

10. Apparatus in accordance with claim 9 in which said electro-optic crystals are rotated in the direction of rotation of said electric field.

11. Apparatus for modulating an incident polarized beam of light in accordance with an asynchronous traveling-wave modulating signal which comprises:
(a) a waveguide for supporting a transverse rotating electric field therein;
(b) a periodic multicrystal structure positioned within said waveguide, said structure comprising
(1) a plurality of crystals exhibiting a transverse electro-optic effect and having principal axes of birefringence therein, each of said crystals having a 3-fold rotation axis in its symmetry point group with said crystals being aligned so that a rotation axis of each is collinear with a rotation axis of the other crystals, and
(2) first dielectric means positioned between adjacent crystals, the velocity of light through the multicrystal structure being determined by the indices of refraction of said crystals and said first dielectric means;
(c) second dielectric means for supporting said multicrystal structure in axial alignment within said waveguide, said second means having a periodic dielectric constant such that the dispersion curve of said waveguide is periodic, the effective dielectric constant of said multicrystal structure and said second dielectric means being selected such that the group velocity of the modulating signal is substantially equal to the velocity of said incident light over a wide band of frequencies; and
(d) means for coupling said modulating signal to said waveguide to provide a rotating electric field therein having a phase velocity differing from the velocity of said incident light to produce rotation of said principal axes of birefringence with respect to the axes of polarization of said beam, each crystal in said multicrystal structure being rotated about said collinear axis with respect to the preceding crystal by an amount equal to one-third the rotation of the electric field in traveling through the crystal to the adjacent surface of the next succeeding crystal with respect to the axes of polarization of said beam, the light beam emerging from the multicrystal structure being cumulatively modulated by said plurality of electro-optic crystals.

12. Apparatus in accordance with claim 11 in which said plurality of crystals comprising said multicrystal structure are optically active.

13. Apparatus for producing single-sideband suppressed carrier modulation of an incident circularly polarized light beam having a first direction of rotation which comprises
    (a) a plurality of crystals exhibiting an electro-optic effect and having principal axes of birefringence therein, each of said crystals having a 3-fold rotation axis in its symmetry point group with said crystals being aligned to form a multicrystal structure having a common 3-fold rotation axis,
    (b) means for applying a rotating modulating electric field within said plurality of crystals thereby producing rotation of the principal axes of birefringence of said crystals, each of said plurality of crystals being rotated about said common 3-fold axis by an amount equal to one-third the rotation of the electric field therein with respect to the axes of polarization of said beam, and
    (c) a circular polarization analyzer axially spaced from said multicrystal structure for transmitting circularly polarized light having a direction of rotation opposite to said first direction.

14. Apparatus for producing single-sideband modulation of an incident polarized light beam which comprises
    (a) a plurality of crystals exhibiting an electro-optic effect and having principal axes of birefringence therein, each of said crystals having a 3-fold rotation axis in its symmetry point group with said crystals being aligned to form a multicrystal structure having a common 3-fold rotation axis,
    (b) means for applying a rotating modulating electric field within said plurality of crystals thereby producing rotation of the principal axes of birefringence of said crystals, each of said plurality of crystals being rotated about said common 3-fold axis by an amount equal to one-third the rotation of the electric field therein with respect to the axes of polarization of said beam, and
    (c) a plane polarization analyzer axially spaced from said multicrystal structure, the light emerging from said analyzer being single-sideband modulated light.

References Cited
UNITED STATES PATENTS

| | | | |
|---|---|---|---|
| 2,766,659 | 10/1956 | Baerwald | 350—150 |
| 2,788,710 | 4/1957 | West. | |
| 3,133,198 | 5/1964 | Kaminow et al. | 250—199 |
| 3,204,104 | 8/1965 | Baird et al. | 350—150 X |
| 3,239,671 | 3/1966 | Buhrer | 250—199 |
| 3,272,988 | 9/1966 | Bloom et al. | 350—150 X |
| 3,278,749 | 10/1966 | Seidel | 250—199 |
| 3,304,428 | 2/1967 | Peters | 250—199 |

ROBERT L. GRIFFIN, *Primary Examiner.*

JOHN W. CALDWELL, *Examiner.*

B. V. SAFOUREK, *Assistant Examiner.*